United States Patent [19]

Franke et al.

[11] Patent Number: 5,586,576
[45] Date of Patent: Dec. 24, 1996

[54] DOSING VALVE HAVING SEAL FAILURE DETECTION

[75] Inventors: Rickard Franke, Dalby, Sweden; Yutaka Kaneko, Wheeling; Per Brandstrom, Lake Zurich, both of Ill.

[73] Assignee: Tetra Laval Holdings & Finance S.A., Pully, Switzerland

[21] Appl. No.: 315,408

[22] Filed: Sep. 28, 1994

[51] Int. Cl.⁶ .................................................. F16K 37/00
[52] U.S. Cl. ......................... 137/559; 137/312; 251/335.2
[58] Field of Search ..................................... 137/559, 312; 251/335.3, 335.2

[56] References Cited

U.S. PATENT DOCUMENTS

| | | | |
|---|---|---|---|
| 1,891,586 | 12/1932 | Woerner | 137/559 |
| 3,838,707 | 10/1974 | Wachowitz, Jr. | 137/312 |
| 4,010,769 | 3/1977 | De Lorenzo et al. | 137/312 |
| 4,694,848 | 9/1987 | Jorgensen et al. | 251/335.2 |
| 4,901,751 | 2/1990 | Story et al. | 137/312 |
| 4,972,867 | 11/1990 | Ruesch | 137/312 |

*Primary Examiner*—A. Michael Chambers
*Attorney, Agent, or Firm*—McAndrews, Held & Malloy, Ltd.; Patrick N. Burkhart

[57] ABSTRACT

A piston-type dosing valve is set forth that provides a hermetically sealed chamber behind the diaphragm which separates the aseptic portion of the valve from the mechanical portion of the valve. An external vacuum source is connected to an opening in the chamber thereby maintaining a constant negative pressure within the chamber. Any breach in the diaphragm will be detected by a pressure sensor located within the sealed chamber. In one embodiment, visual inspection for the presence of liquid product in the sealed chamber can be accomplished through a window in the dosing valve housing located adjacent to the diaphragm and sealed chamber.

4 Claims, 3 Drawing Sheets

5,586,576

DOSING VALVE HAVING SEAL FAILURE DETECTION

TECHNICAL FIELD

The present invention relates generally to automated filling machines for liquid containers and pertains, more specifically, to a dosing valve embodying elements which allow visual and electrical detection of a faulty seal in the sterile valve environment.

BACKGROUND

A variety of dosing devices for liquid or semi-viscous products are known for use in automated filling machines. These valves serve to allow a predetermined amount of product to flow from a product supply reservoir into a container.

One valve that is commonly used in automated filling machines is a piston valve. A piston valve typically includes an elongated, cylindrical housing with an outlet at the bottom end of the housing. An inlet in the side of the housing above the outlet allows product to flow into the housing. A valve seat defines the separation between the inlet and the outlet. A plug sits against the outlet side of the valve seat. The plug is attached to a rod which runs coaxially with the housing from the plug to a pneumatic rod drive attached at the top of the housing. When the rod is forced downward by the rod drive, the plug disengages the valve seat allowing product to flow from the inlet to the outlet. This downward position is held until the desired amount of product has flowed through the valve. Then the rod drive pulls the rod upwards forcing the plug against the valve seat. This prevents product from flowing through to the outlet until a new container is in place for filling.

The shelf life of liquid products such as milk or juice is directly related to the amount of contaminants allowed to come into contact with the product before being sealed in the sterile environment of a container. The greater the amount of the contaminants, the lower the shelf life. Therefore, maintaining a sealed aseptic environment for the product as it passes through a valve is desirable. It is also desirable to maintain a seal between the liquid product and the remaining mechanical portions of the valve to avoid fouling of the valve or corrosion of its parts.

The manufacturers of piston-type dosing valves have attempted to solve the above mentioned problems by attaching a flexible diaphragm around the rod to the interior wall of the housing above the inlet thereby sealing the mechanical portion of the valve, including the pneumatic rod drive, from the path of the product. The diaphragm is an effective seal as long as the diaphragm remains intact but, because the diaphragm is continuously being stretched by movement of the rod and pressure of the product, the diaphragm material tends to fatigue. This creates the further problem of detecting a breach in the diaphragm seal. Currently, the only way to accomplish such detection is by shutting down the filling machine and disassembling the valve. Machine downtime and labor of a machine technician add to the cost of the final product.

SUMMARY OF THE INVENTION

A dosing valve is set forth that overcomes many of the problems of the prior art by providing a hermetically sealed chamber behind the diaphragm which separates the aseptic portion of the valve from the mechanical portion of the valve. An external vacuum source is connected to an opening in the chamber thereby maintaining a constant negative pressure within the chamber. Any breach in the diaphragm will be detected by a pressure or contact sensor located within the sealed chamber. In one embodiment, visual inspection for the presence of liquid product in the sealed chamber can be accomplished through a window in the dosing valve housing located adjacent to the diaphragm and sealed chamber.

DESCRIPTION OF THE PREFERRED EMBODIMENT

Figure 1:
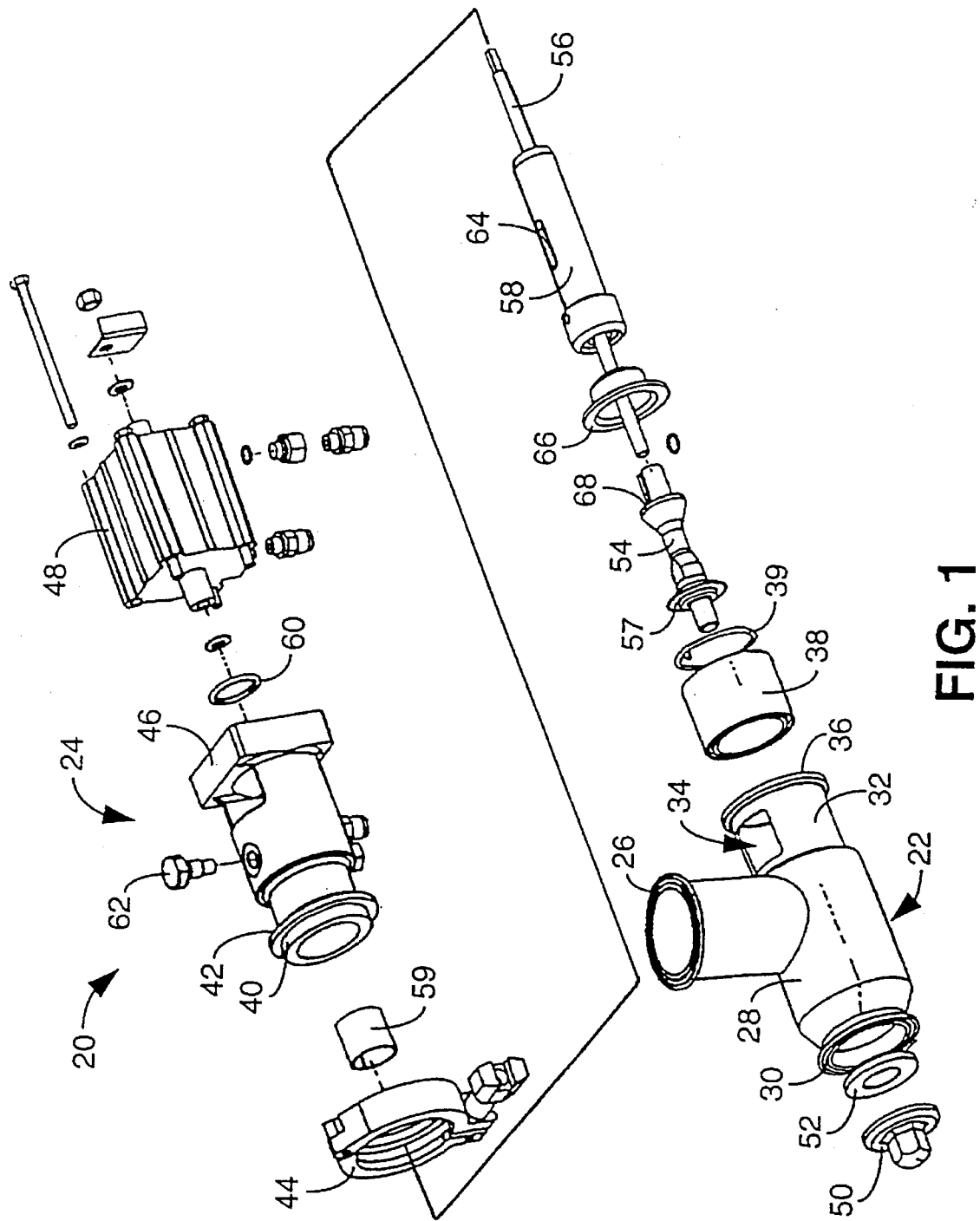
FIG. 1 is an exploded view of a dosing valve.

FIG. 1 illustrates a piston-type dosing valve 20 embodying elements which allow visual and electrical detection of a faulty seal. The valve housing is made up of a lower valve body 22 and an upper valve body 24. The lower valve body 22 has a generally cylindrical interior (not shown). In communication with the interior of the lower valve body 22 is an inlet 26 which enters through a sidewall 28 of the lower valve body. The inlet 26 can be connected to a product reservoir (not shown in FIG. 1). Also in communication with the interior of the lower valve body 22 is a circular outlet 30 at one end of the lower valve body 22. A circular valve seat (not shown in FIG. 1) is formed on the inner surface of the sidewall 28 of the lower valve body 22 between the inlet 26 and the outlet 30.

At the other end of the lower valve body 22 is a connection cylinder 32 for connecting the lower valve body 22 to the upper valve body 24. A pair of viewing ports 34 (only one shown) are cut out of the sidewall of the connection cylinder 32 and a rim 36 is formed about the end of the connection cylinder 32. A cylindrical transparent sleeve 38 made of, for example, hardened glass fits concentrically inside the connection cylinder 32. An o-ring 39 sits in a channel (not shown in FIG. 1) in the end of the transparent sleeve 39.

The upper valve body 24 has a connection lip 40 at one end which is complementary to the connection cylinder 32 of the lower valve body 22. A flange 42 is formed about the connection lip 40. This connection lip 40 has substantially the same outer diameter as the transparent sleeve 38 so it can slide into connection cylinder 32 to sealingly engage the o-ring 39 and transparent sleeve 38. The upper valve body 24 is connected to the lower valve body by a clamp 44 which engages the flanges 36 and 42.

A mounting block 46 is formed at the other end of the upper valve body 24 to which is mounted a pneumatic rod drive 48. A bore (not shown in FIG. 1) is formed through the interior of the upper valve body 24 which is in axial alignment with the rod drive 48 and the valve seat (not shown in FIG. 1) of the lower valve body 22.

Opening and closing of the valve 20 is effected by engagement and disengagement of the plug cap 50 and plug ring 52 with the outlet side of the valve seat (not shown in FIG. 1). The plug cap 50 is connected by a valve stem 54 to a rod 56 which is, in turn, connected to be driven by the rod drive 48. The plug ring 52 is engaged between the plug cap 50 and a flange 57 of the valve stem 54. A plunger 58 is connected to the valve stem 54 for co-movement with the valve stem 54 and the rod 56. The plunger 58 made of, for example, stainless steel is slidably secured by a bushing 59 made of, for example, plastic within the bore in the upper valve body 24 which allows the plunger 58 and rod 56 to slide axially in the bore. A sealing ring 60 which sealingly engages the plunger 58 is also mounted within the bore. A screw 62 enters through the sidewall of the upper valve body 24 and slidingly engages a channel 64 in the plunger 58 thereby limiting the axial movement of the rod 56 and preventing rotation thereof.

A flexible circular diaphragm 66 is engaged at its interior edge between an upper flange 68 of the valve stem 54 and the plunger 58. The diaphragm 66 is also secured at its exterior edge by engagement between the transparent sleeve 38 and a ridge formed on the inside of the sidewall 28 proximate the inlet 26. The diaphragm 66, for example, is made of an FDA approved silicone elastomer having a nomex polymide fabric with a thread count of 62×58 threads/inch having a tensile strength of 145×135 pounds/inch.

Figure 2:
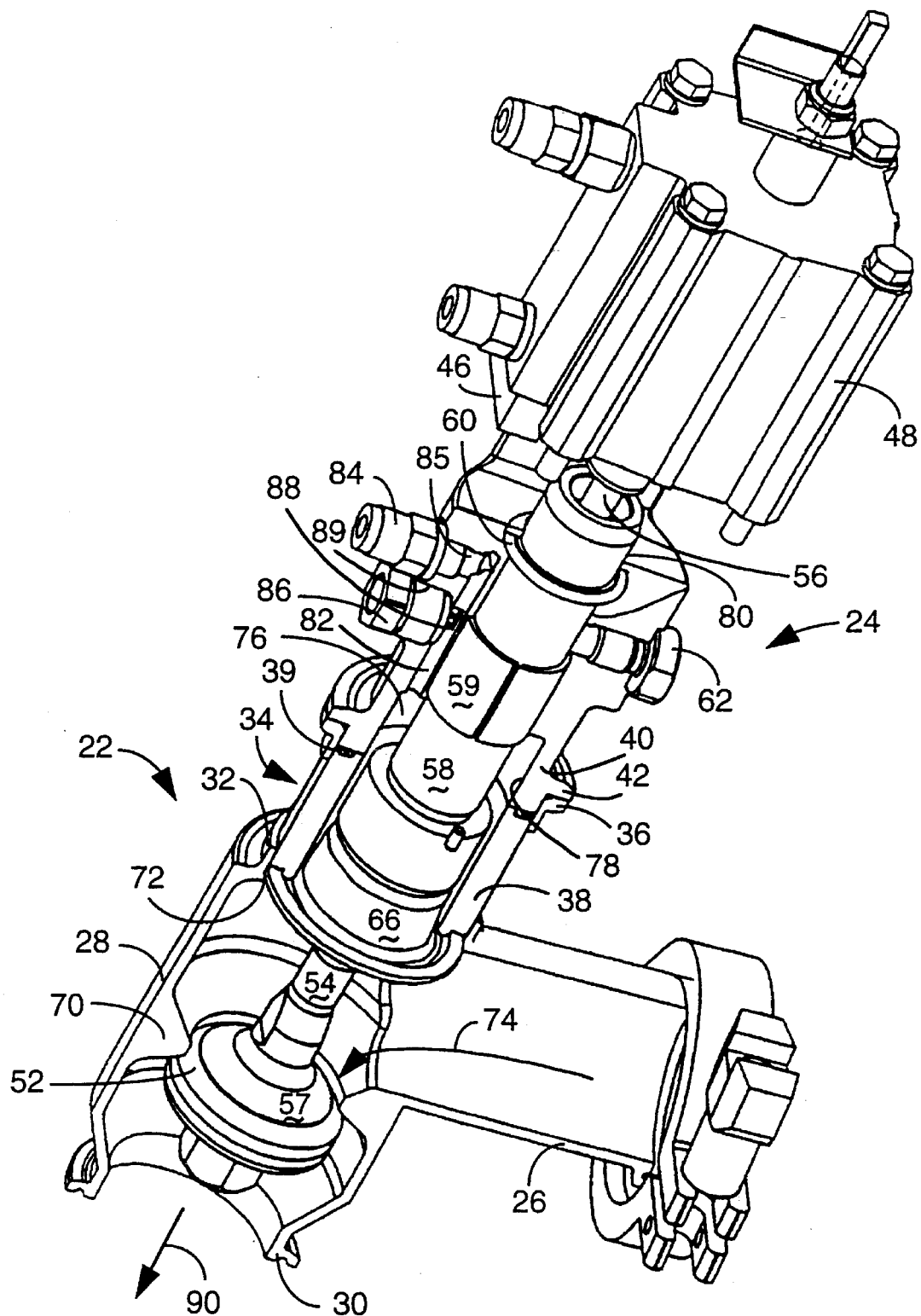
FIG. 2 is a perspective sectional view of the dosing valve of FIG. 1.

FIG. 2 shows a perspective sectional view of the dosing valve 20 illustrating the orientation of its parts when assembled. The interior of the lower valve body 22 and upper valve body 24 are revealed to show the valve seat 70 and the ridge 72 for engaging the outer edge of the diaphragm 66.

The interior cavity defined within the upper and lower valve bodies 22 and 24 is divided by the diaphragm 66. The diaphragm 66 seals the aseptic product path (indicated by arrow 74) from a chamber 76 surrounding the plunger 58. The chamber 76 is hermetically sealed and is defined by the diaphragm 66 at its lower end, by the sealing ring 60 at its upper end, and by the transparent sleeve 38 and the inner wall 78 and bore 80 of the upper valve body 24.

A bore 82 in the inner wall 78 running parallel to the bore 80 is in fluid communication with the chamber 76. A vacuum line 84 is connected to the bore 82 through a hole 85 in the upper valve body 24. This vacuum line 84 is connected to a vacuum source (not shown) which maintains a negative pressure of, for example, 80% of atmospheric pressure within the chamber 76. An adaptor 86 holds a pressure or contact sensor 88 within another hole 89 through the upper valve body 24 to the bore 82. This sensor 88 is electrically connected to a monitoring circuit which detects any rise in the pressure within the chamber 76 or, if a contact sensor is used, the presence of liquid draw into the chamber 76 by the under-pressure. Such a rise in pressure or the pressure of liquid will be indicative of a breach in the diaphragm 66. Alternatively, a contact sensor may be used at 88 and/or an external pressure sensor may be used exterior to the dosing valve.

As can be seen, downward axial movement (indicated by arrow 90) of the rod 56, plunger 58 and valve stem 54 will cause the plug ring 52 to disengage the valve seat 70. The diaphragm 66 is flexible allowing it to move with the valve stem 54 and plunger 58. Closing of the valve by upward force of the rod drive 48 is desirably expedited because the negative pressure within the chamber 76 behind the diaphragm 66 creates additional upward force on the diaphragm 66.

The chamber 76 and diaphragm 66 can also be visually inspected through the transparent sleeve 38. The presence of product in the chamber 76 will visually indicate a breach in the diaphragm 66.

Figure 3:
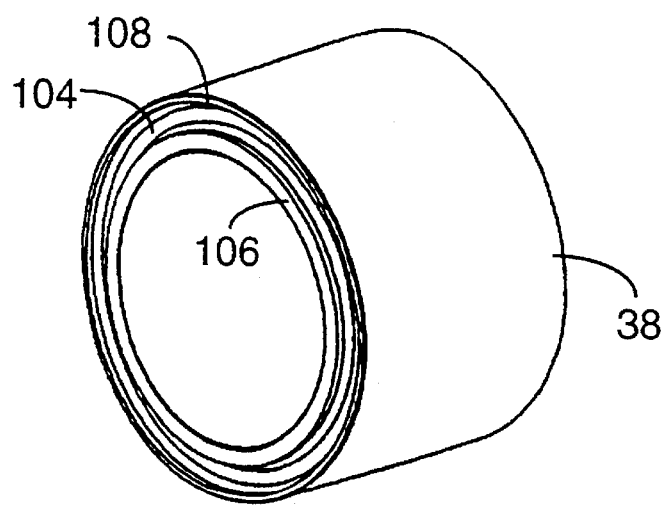
FIG. 3 is a perspective view of the glass sleeve of FIG. 1.
Figure 4:
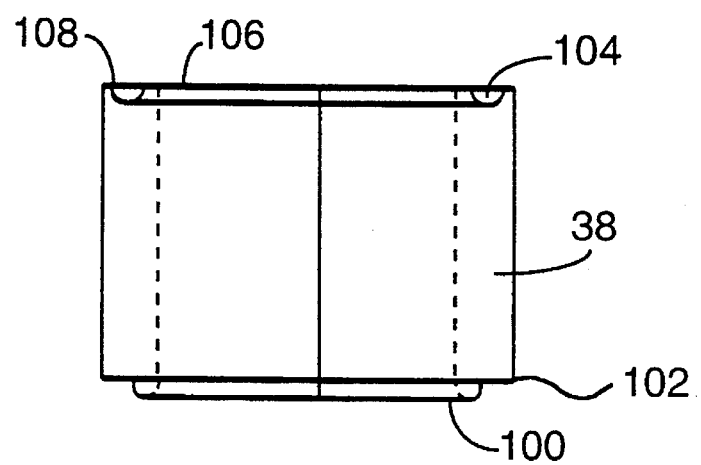
FIG. 4 is a side view of the glass sleeve of FIG. 1.

FIGS. 3 and 4 illustrate the transparent sleeve 38 in greater detail. As can be seen, in FIG. 4, the end of the transparent sleeve 38 that sealingly engages the diaphragm 66 has a concentric inner flange 100 which extends below the outer rim 102. The end of the transparent sleeve 38 that sealingly engages the connection lip 40 of the upper valve body 24 has a concentric channel 104 creating an inner rim 106 and an outer rim 108. The o-ring 49 (shown in FIGS. 1 and 2) sits partially in this channel 104.

Although the present invention has been described with reference to a specific embodiment, those of skill in the art will recognize that changes may be made thereto without departing from the scope and spirit of the invention as set forth in the appended claims.

We claim:

1. A dosing valve comprising:
    a) an elongated cylindrical housing having an outlet at a first end and an inlet through a sidewall defining a path for product to pass through the housing, the housing further having a flange at a second end thereof;
    b) a connection cylinder at the second end of the elongated housing, the connection cylinder having a first end adjacent the second end of the elongated housing, a second end, and a viewing opening disposed through a sidewall thereof;
    c) a valve seat disposed between the outlet and the inlet;
    d) a plug adapted to engage the valve seat thereby sealing the inlet from the outlet;
    e) a rod attached to the plug and extending therefrom into the connection cylinder at the second end of the housing;
    f) a rod drive attached at the second end of the housing for moving the rod between a first position in which the plug engages the valve seat and a second position in which the plug disengages the valve seat;
    g) a flexible diaphragm mounted about the second end of the housing and sealing the connection cylinder from the path of product, the flexible diaphragm flexing with movement of the rod, the flexible diaphragm having a flange; and
    h) a transparent sleeve dimensioned to fit within and seal with the connection cylinder, the transparent sleeve allowing direct visual observation of the flexible diaphragm through the viewing opening of the connection cylinder; and
    g) means sealing the second end of the connection cylinder, the transparent sleeve having a first end securing the flange of the flexible diaphragm against the flange of the elongated housing and a second end adjacent the sealing means.

2. A dosing valve as claimed in claim 1 wherein the sealing means and diaphragm define a hermetically sealed chamber, the dosing valve further comprising:
    a) a vacuum source in communication with the sealed chamber for maintaining a negative pressure within the chamber; and
    b) a pressure sensor in communication with the sealed chamber to monitor pressure therein, a rise in pressure being indicative of a breach of the diaphragm.

3. A dosing valve comprising:
    a) a housing having an inlet and an outlet defining a path through which product enters and exits the housing;
    b) a connection cylinder extending from one end of the housing, the connection cylinder having a first end adjacent the housing, a second end, and a viewing opening disposed through a sidewall thereof;

c) a valve disposed within the housing between the inlet and the outlet;

d) a mechanical drive connected to the valve adapted to open and close the valve;

e) a flexible diaphragm within the housing separating the path of the product from the mechanical drive, the flexible diaphragm being movable with the mechanical drive during operation of the dosing valve;

f) sealing means disposed proximate the second end of the connection cylinder, the flexible diaphragm and the sealing means forming a hermetically sealed chamber; and g) transparent sleeve dimensioned to fit within and seal with the connection cylinder, the transparent sleeve allowing direct visual observation of the flexible diaphragm through the viewing opening of the connection cylinder.

4. A dosing valve as claimed in claim 3 and further comprising:

a) a vacuum source in communication with the hermetically sealed chamber for maintaining a negative pressure within the chamber; and b) a pressure sensor in communication with the sealed chamber to monitor pressure therein, a rise in pressure being indicative of a breach of the diaphragm.

* * * * *